United States Patent
Gust

(10) Patent No.: US 7,854,289 B2
(45) Date of Patent: *Dec. 21, 2010

(54) ARRANGEMENT OF A FRONT HOOD HAVING AN ADJUSTING LEVER ON A VEHICLE

(75) Inventor: Peter Gust, Herscheid (DE)

(73) Assignee: Kirchhoff GmbH & Co. KG, Halver (DE)

( * ) Notice: Subject to any disclaimer, the term of this patent is extended or adjusted under 35 U.S.C. 154(b) by 992 days.

This patent is subject to a terminal disclaimer.

(21) Appl. No.: 10/589,790

(22) PCT Filed: Feb. 17, 2005

(86) PCT No.: PCT/DE2005/000273

§ 371 (c)(1),
(2), (4) Date: Aug. 17, 2006

(87) PCT Pub. No.: WO2005/077719

PCT Pub. Date: Aug. 25, 2005

(65) Prior Publication Data

US 2007/0151791 A1 Jul. 5, 2007

(30) Foreign Application Priority Data

Feb. 17, 2004 (DE) .................. 10 2004 007 858

(51) Int. Cl.
*B60R 21/34* (2006.01)
(52) U.S. Cl. ........................... 180/274; 180/69.1
(58) Field of Classification Search ............ 180/274, 180/69.2, 69.21; 296/187.04, 187.09
See application file for complete search history.

(56) References Cited

U.S. PATENT DOCUMENTS

| 4,727,621 A | 3/1988 | Emery et al. |
| 6,554,093 B2 | 4/2003 | Sasaki et al. |

(Continued)

FOREIGN PATENT DOCUMENTS

DE 2 814 107 A1 10/1979

(Continued)

OTHER PUBLICATIONS

International Search Report in English.

*Primary Examiner*—Paul N. Dickson
*Assistant Examiner*—George D. Spisich
(74) *Attorney, Agent, or Firm*—Collard & Roe, P.C.

(57) ABSTRACT

The invention relates to a front hood arrangement on a vehicle, comprising a hinge mechanism that is located in the rear relative to the direction of travel and is embodied as a quadruple joint with a long and a short pull rod. The hinge mechanism allows the front hood to be swiveled during normal opening and closing while allowing the same to be raised in the rear zone during a collision of the vehicle. Such a hinge mechanism is provided with a spring element which actuates an adjusting lever during a collision while the adjusting lever acts directly upon the front hood and rests thereupon either directly or via intermediate elements. The joints of the quadruple joint located at the front hood end are hingedly fixed to a swiveling lever. In the neutral position, one end of the swiveling lever is removably fastened to the front hood while the other end thereof can be swiveled relative to the front hood about a pivot joint that is disposed in the area where the adjusting lever is associated with the front hood. The adjusting lever, which is guided by the pull rods of the quadruple joint and the swiveling lever that detaches from the front hood at one end, lifts the front hood relative to the neutral state in the event of a collision.

17 Claims, 6 Drawing Sheets

U.S. PATENT DOCUMENTS

Figure 1:
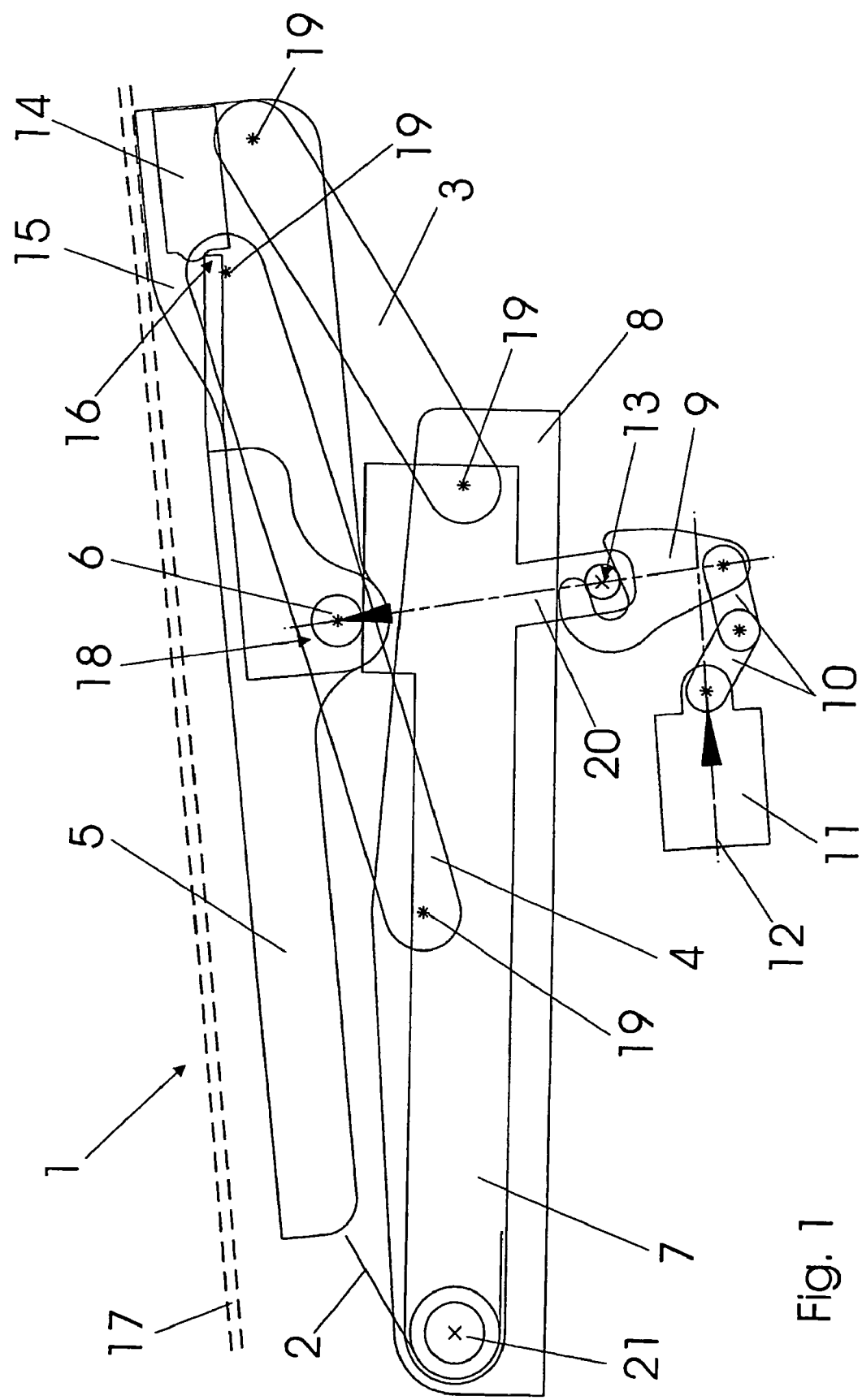

| | | |
|---|---|---|
| 6,571,901 B2 | 6/2003 | Lee |
| 6,588,526 B1 * | 7/2003 | Polz et al. ................ 180/69.21 |
| 6,755,268 B1 * | 6/2004 | Polz et al. ................ 180/69.21 |
| 6,934,999 B2 * | 8/2005 | Kreth et al. .................... 16/222 |
| 6,964,316 B1 * | 11/2005 | Polz et al. ................... 180/274 |
| 7,000,720 B2 * | 2/2006 | Polz et al. ................ 180/69.21 |
| 7,128,361 B2 | 10/2006 | Guillez et al. |
| 7,207,406 B1 * | 4/2007 | Polz et al. ................ 180/69.21 |
| 7,231,995 B1 * | 6/2007 | Polz et al. ................ 180/69.21 |
| 7,506,716 B1 * | 3/2009 | Salmon et al. .............. 180/274 |

FOREIGN PATENT DOCUMENTS

| | | |
|---|---|---|
| DE | 197 12 961 | 10/1998 |
| DE | 197 12 961 A1 | 10/1998 |
| DE | 101 11 146 | 3/2002 |
| DE | 100 55 828 | 5/2002 |
| DE | 101 16 717 A1 | 10/2002 |
| DE | 101 44 811 | 3/2003 |
| DE | 203 14 673 U1 | 12/2003 |
| DE | 103 43 882 | 4/2005 |

* cited by examiner

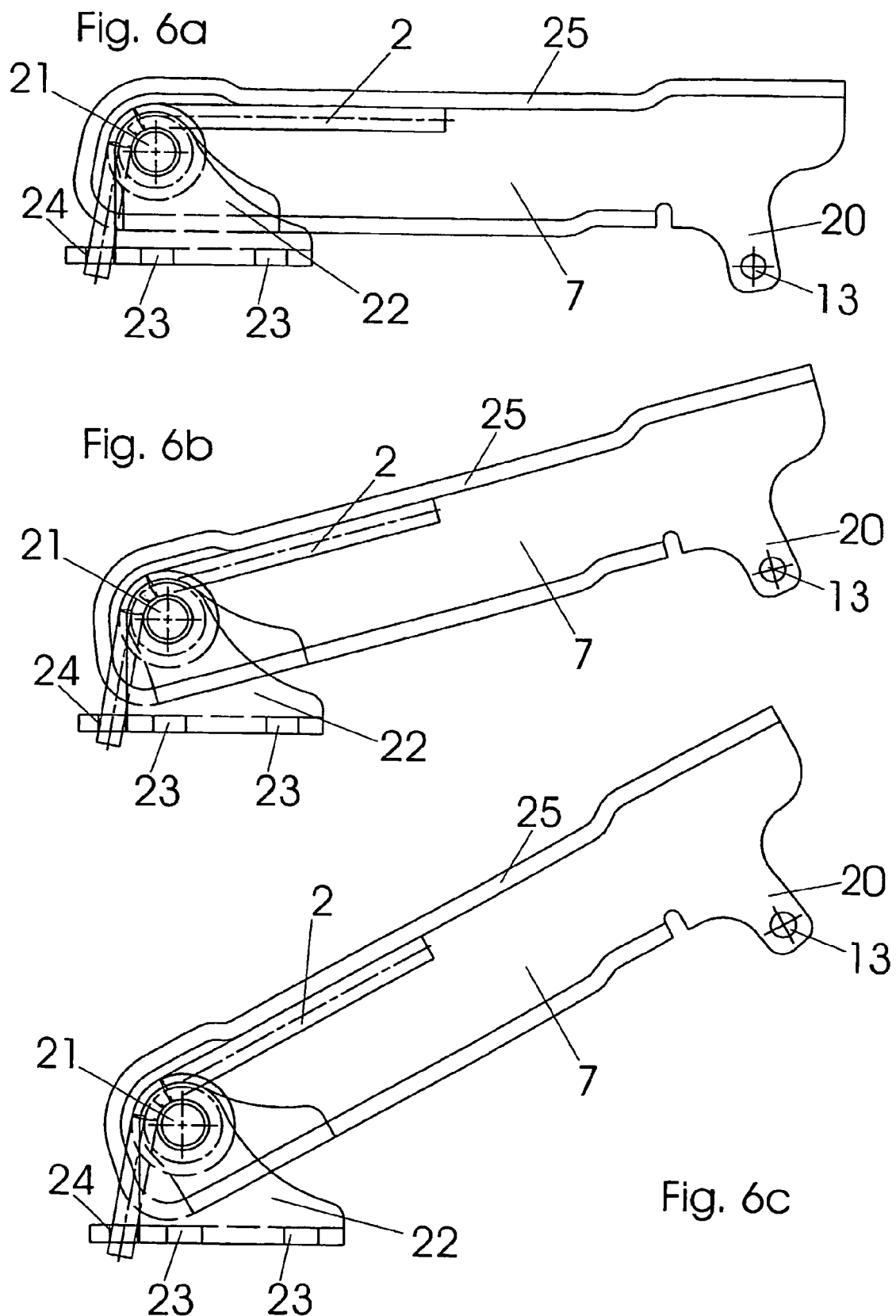

ARRANGEMENT OF A FRONT HOOD HAVING AN ADJUSTING LEVER ON A VEHICLE

CROSS REFERENCE TO RELATED APPLICATIONS

Applicant claims priority under 35 U.S.C. §119 of German Application No. 10 2004 007 858.0 filed Feb. 17, 2004. Applicant also claims priority under 35 U.S.C. §365 of PCT/DE2005/000273 filed Feb. 17, 2005. The international application under PCT article 21(2) was not published in English.

The invention relates to an arrangement of a front hood on a vehicle, in accordance with the preamble of claim 1.

To improve the protection, particularly of pedestrians who can collide with a vehicle in standard accident situations, it has been known for some time to make provision on the vehicles, by means of different types of devices, for the impact zone of the pedestrian on the vehicle, usually in the region of the front hood, to be configured to be softer and thereby for the impact of the pedestrian on the front hood to be made milder. For this purpose, it has been described, for example, to provide impact bags in this region, similar to airbags in the interior of the vehicle, which are triggered by corresponding sensors in the front region of the vehicle if a collision is detected.

Another solution consists in bringing the front hood of the vehicle out of its rest position just above the engine block into a position that has a greater distance from the rigid parts of the vehicle and, in particular, the engine block, before the impact of the pedestrian, by means of suitable measures. For this purpose, it is proposed to raise the front hood in its rear region and thereby to guarantee targeted deformation of the front hood during impact of the pedestrian.

A plurality of technical devices has been proposed to solve this basic idea. Thus, it is known from DE 2 814 107 A1, for example, to dispose a special device in the rear region of the front hood, which raises the front hood relative to its rest position within a very short period of time, if a corresponding impact is detected. Furthermore, it is known from DE 197 12 961 A1, for example, to modify the hinge device that is required for normal activation of the front hood, in any case, which nowadays is mainly configured in the form of four-joint hinges, in such a manner that an additional setting movement deflects the four-joint hinge out of its rest position, in the case of a collision, in such a manner that the front hood articulated onto the four-joint hinge is raised. An energy storage unit in the form of a helical spring, which is disposed below the four-joint hinge, in biased manner, and is released from its biased position in the case of a collision, and suddenly relaxed, serves for this purpose. In this connection, the helical spring acts on a lever that raises the two joints of the four-joint hinge on the car body side, and thereby raises the entire four-joint hinge as well as the front hood articulated onto it.

Furthermore, it is known from DE 101 44 811 A1 to allow a corresponding energy storage unit to act not on a lever that is disposed on the underside of the four-joint hinge, but instead to dispose additional levers on the four-joint hinge, which levers, because of their position, cause additional movements of the four-joint hinge, because of the sudden release of the energy storage unit, and thereby to bring about greater lifting movements of the front hood. However, such ancillary connecting bars make the kinematics of the four-joint hinge more complicated.

Furthermore, it is known from DE 103 43 882.3 A1 to pass the transfer of the movement that becomes free due to the energy release of the energy storage unit, in the case of a collision, and results in a movement of the front hood in an upward direction, directly from the energy storage unit to the front hood. For this purpose, the energy storage unit is configured in the form of a helical spring, which displaces a ram disposed coaxially to it during energy release, which ram raises the front hood directly or by way of intermediate elements disposed on the front hood itself. In this way, direct and simple transfer of the energy that becomes free as the result of triggering of the energy storage unit to the front hood becomes possible.

It is therefore the task of the invention to further develop an arrangement of a front hood on a vehicle, in such a manner that a hinge device with simple effect is created, which makes fast and reliable raising of the rear region of the front hood possible in the case of a pedestrian impact on the front hood and, at the same time, is further simplified in design and reliably structured.

The solution for the task according to the invention results from the characterizing features of claim 1 in interaction with the characteristics of the preamble. Further advantageous embodiments of the invention result from the dependent claims. The invention proceeds from an arrangement of a front hood on a vehicle, having at least one hinge device that lies in the rear when viewed in the direction of travel, in the form of a four-joint having a long and a short connecting bar, whereby the front hood can be pivoted by means of the hinge device during normal opening and closing, and can be raised in the rear region in the case of a collision of the vehicle. An arrangement of the front hood of this type is developed further in that the hinge device has a spring element that activates an adjustment lever in the case of a collision of the vehicle, which lever in turn lies on the front hood directly or by way of intermediate elements, whereby the joints of the four-joint on the front hood side are fixed in place on a pivot lever, in articulated manner, which lever, in the state of rest, is releasably fixed in place on the front hood with one end, and can be pivoted about a rotary joint, relative to the front hood, with its other end, in the region of the articulation of the adjustment device on the front hood, and the adjustment lever raises the front hood during a collision of the vehicle, guided by the connecting bars of the four-joint, and raises the pivot lever, which comes loose from the front hood on one side, as compared with the state of rest. Such an arrangement according to the invention makes it possible to bring about a direct adjustment of the front hood simply by pivoting the adjustment lever, thereby making it possible to do without complicated intermediate elements, and for the arrangement to function reliably even after a long period of rest, i.e. non-activation. Also, the configuration of the arrangement by way of a lever mechanism can be implemented with a particularly simple design, and can be controlled well with regard to its behavior. The normal function of the front hood during opening is not changed by the arrangement, and therefore takes place in usual manner and without any changes for the user. In this connection, the releasable fixation of the pivot lever on the front hood is only released in the case of a collision, and only in this way are the additional kinematics for raising the front hood in the rear region, in the case of a collision with a pedestrian or the like, made available. At the same time, when this additional raising movement is carried out, the front hood continues to be guided securely, and therefore can also be raised only within the scope predetermined by the design. In this way, impairment of the view of the vehicle driver by the front hood is also reliably precluded, even in case of a collision.

In a first advantageous further development, the pivot lever is releasably fixed in place on the front hood with its one end, in such a manner that when a predetermined force in the direction of the change in position of the adjustment lever is exceeded, it releases its releasable connection with the front hood when the adjustment lever is triggered, and it can be pivoted about its rotary joint disposed on the front hood at its other end. In this way, it is guaranteed that the pivot lever cannot already release its firm connection with the front hood as the result of minor stresses, for example when driving through potholes or the like, but only if a corresponding threshold value of stress is exceeded, for example due to the action of the adjustment lever on the front hood. In this way, the additional movement possibility of the hinge device is released, and raising the hood in the rear region is made possible. It is advantageous in this connection if the pivot lever is fixed in place on the front hood with one end, by way of a non-positive-lock and/or positive-lock connection. Such a non-positive-lock or positive-lock connection can be formed, for example, by a mechanical catch connection in which one functional edge on the pivot lever engages behind a counter-shape disposed on the front hood side, and is locked in place with it in the normal state of rest of the front hood. Such a catch connection can be implemented with a simple design and can always be reliably released again even after long non-activation, so that activation is always reliably guaranteed, even after many years of non-operation of the hinge device, in the sense of accident protection. Also, it can be assured, by means of corresponding setting devices, that the force for releasing the catch connection adheres precisely to predetermined values, and therefore the operational reliability is increased.

An advantageous further development provides that the front-hood-side end of the adjustment lever stands in a non-positive-lock connection by way of an essentially pin-like segment on the front hood. Such a connection has the advantage of guaranteeing reliable release of adjustment lever and pin-like segment from one another even after longer non-activation. This is particularly advantageous if the essentially pin-like segment on the front hood can be lifted off the adjustment lever during normal operation of the hinge device to open the front hood by means of the four-joint. In this way, it is always guaranteed that the assignment of the front hood to the adjustment lever reaches a defined state and therefore there is a defined mobility of the front hood and an unambiguous transfer of the forces from the energy storage unit to the front hood, if the rear region of the front hood is raised in the case of a collision.

It is advantageous in this connection that when the adjustment lever is released in the case of a collision, the adjustment lever suddenly pushes the pin-like segment on the front hood in the direction towards the raised position of the front hood and, in this connection, the pivot lever releases its non-positive-lock connection with the front hood, at its end releasably fixed in place on the front hood, and pivots relative to the front hood about its rotary joint formed at its other end. In this connection, the interaction of the pivot lever with the two connecting bars of the four-joint hinge guarantees the additional required mobility of the front hood for being raised in its rear region. However, the path of the front hood during this raising movement, as well as the maximal raising height, is clearly defined with this, and the front hood is reliably fixed in place on the car body side, during this entire movement, and also in the raised position.

In the state of rest, it is advantageous if the front-hood-side end of the adjustment lever is disposed and fixed in place on the car body side in such a manner that the essentially pin-like segment on the front hood rests against the adjustment lever. In this state, the adjustment lever simply forms a fixed counter-bearing for the pin-like segment of the front hood, so that the front hood can be brought back into a defined state after normal opening and closing, and is held securely there for normal operation of the vehicle.

With regard to the kinematics of the front hood during raising in the rear region in the case of a collision, it is advantageous if the rotary joint of the pivot lever on the front hood and the pin-like segment of the front hood have an identical point of rotation. In this way, for one thing the mobility of the pivot lever, in terms of design and, at the same time, the bearing for the pin-like segment on the front hood can be produced in simple manner, and for another, there is the result, in a further embodiment, that because of the rotary movement of the pivot lever, on the one hand, and the setting movement of the adjustment lever, on the other hand, the front hood performs a pure pivot movement about a closure device disposed on the front end side of the vehicle, on the front hood, without any relative displacements of the front hood in the longitudinal direction of the vehicle, relative to the closure device in the case of a collision. In this way, it is reliably precluded that the front hood can jam on the closure device disposed on the front end side, when it is raised in its rear region. If a displacement of the front hood in the longitudinal direction of the vehicle occurs in the region of this closure device, disposed on the front side, jamming and incomplete raising of the front hood can occur, thereby lowering the protection effect of the raised front hood, or actually reducing it to zero. This can be reduced to zero by means of coordinating the kinematics of the pivot lever with the direct effect of the adjustment lever on the front hood and the location of the points of rotation, in each instance, relative to one another, in such a manner that no longitudinal displacement of the front hood of any kind occurs in the region of the closure device disposed on the front side.

It is advantageous if the spring element has a mechanical leg spring that is biased in the normal state of operation of the arrangement. Such mechanical springs can always be reliably activated even after many years of non-operation, are structured in mechanically robust manner, and can be biased again by means of corresponding forces, at any time. Contaminants or vibrations in normal driving operation also do not impair the functions of mechanical springs in case of a collision. Appropriate deflections can be achieved by means of the shaping and the levers of the leg springs, thereby guaranteeing optimal adjustment of the adjustment lever in the case of a collision.

Furthermore, it is possible that the adjustment lever is held in the state of being biased by the spring element, in the state of rest, by means of a triggering device. Such a triggering device, which in a further embodiment can be controllable by way of an actor, for example, in the case of a collision, and can release the adjustment lever from its biased state, by way of lever devices, with mechanical amplification, secures the adjustment lever with regard to unintentional release and nevertheless allows secure release of the adjustment lever even after many years of non-operation.

The activation of the triggering device can be configured in particularly simple manner if the actor has an electromagnetic switch. Such an actor can utilize the electrical energy that is present in the vehicle in any case, and allows a relatively great setting force as well as a short response time.

It is furthermore advantageous if the triggering device has a hook-like segment that engages behind an assigned segment of the adjustment lever in the state of rest, and secures the adjustment lever in its position counter to the effect of the spring element of the. In this connection, in a further embodiment, the hook-like segment of the triggering device, the adjustment lever, and the spring element can be made to be brought back into their starting state after triggering of the front hood, and can be activated again. By means of such a simple and operationally reliable mechanism, the force of the actor can be reliably implemented and the spring element can be triggered in simple manner. At the same time, the system can be configured to be reversible, so that after a collision, the hinge device can easily be brought back into its normal state of rest, something that is of importance, in particular, in the case of incorrect triggering without a subsequent impact, for example, and, at the same time, lowers costs.

Likewise, in another embodiment it is possible that the spring element has a fluid medium. For this purpose, hydraulic media, gas media, or even pyrotechnically produced fluid media can be used, in order to introduce a high energy density into the hinge device within a short period of time.

In terms of assembly and adjustment technology, it is advantageous if the pivot lever and the pin-like segment are fixed in place on the front hood by means of a common assembly part. In this way, the entire module can be affixed to the front hood as a pre-assembled whole, and adjusted, thereby making it possible to greatly lower assembly costs. Also, the risk of accident during assembly is greatly reduced, since activations of the pivot lever by means of the spring force which would otherwise be necessary during assembly can be refrained from.

The drawing shows a particularly preferred embodiment of the arrangement according to the invention.

Figure 2:
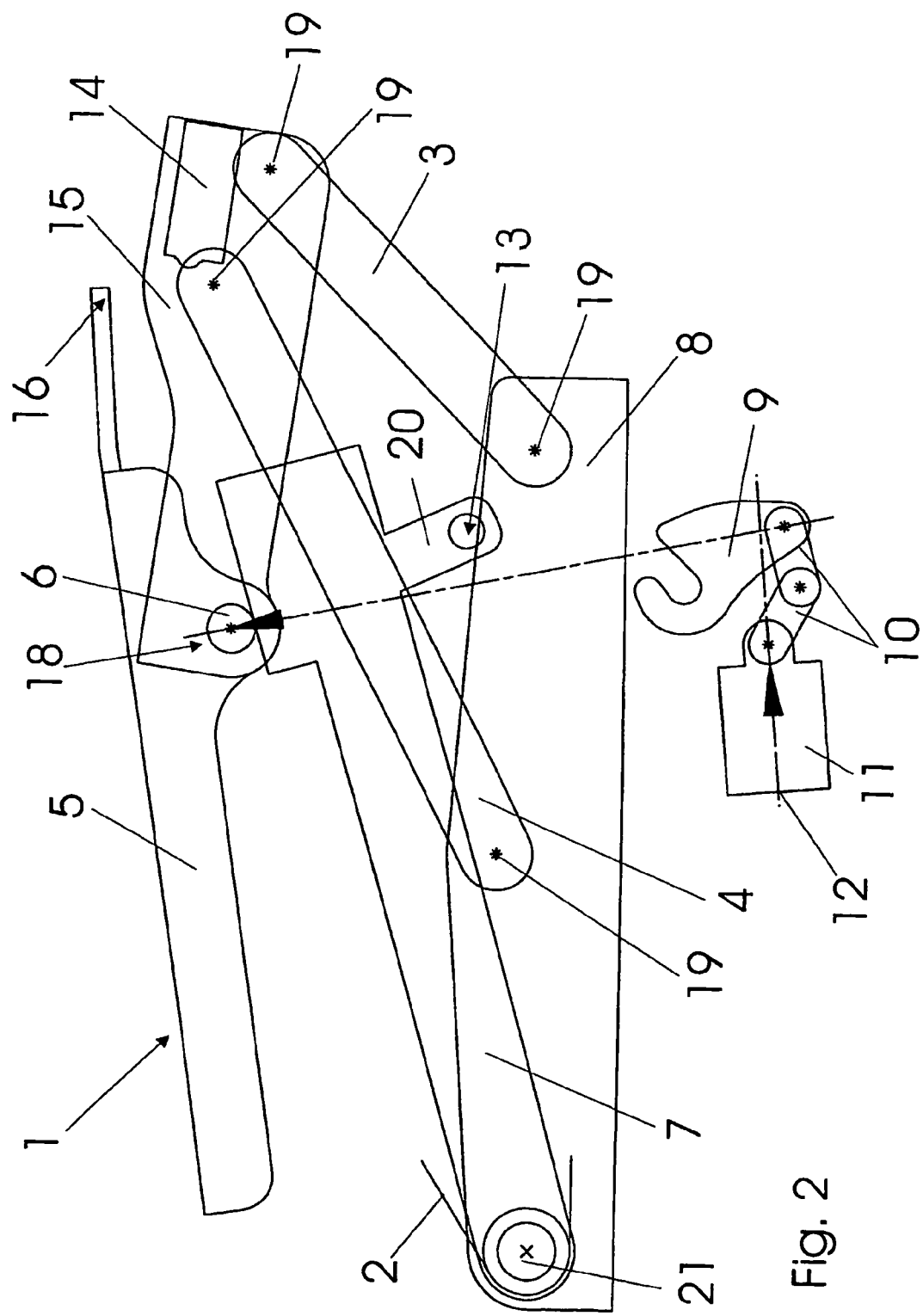
Figure 3:
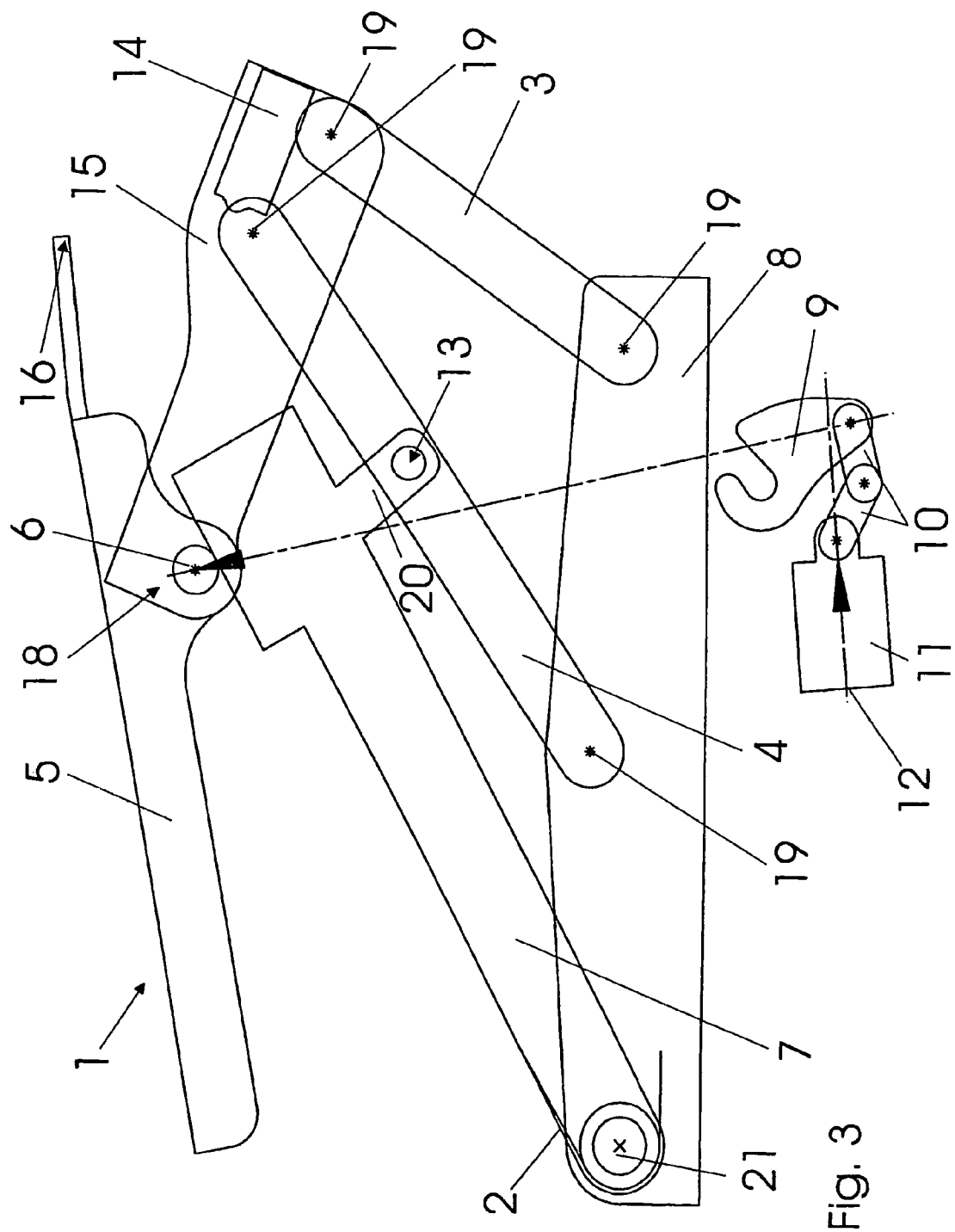
Figure 4:
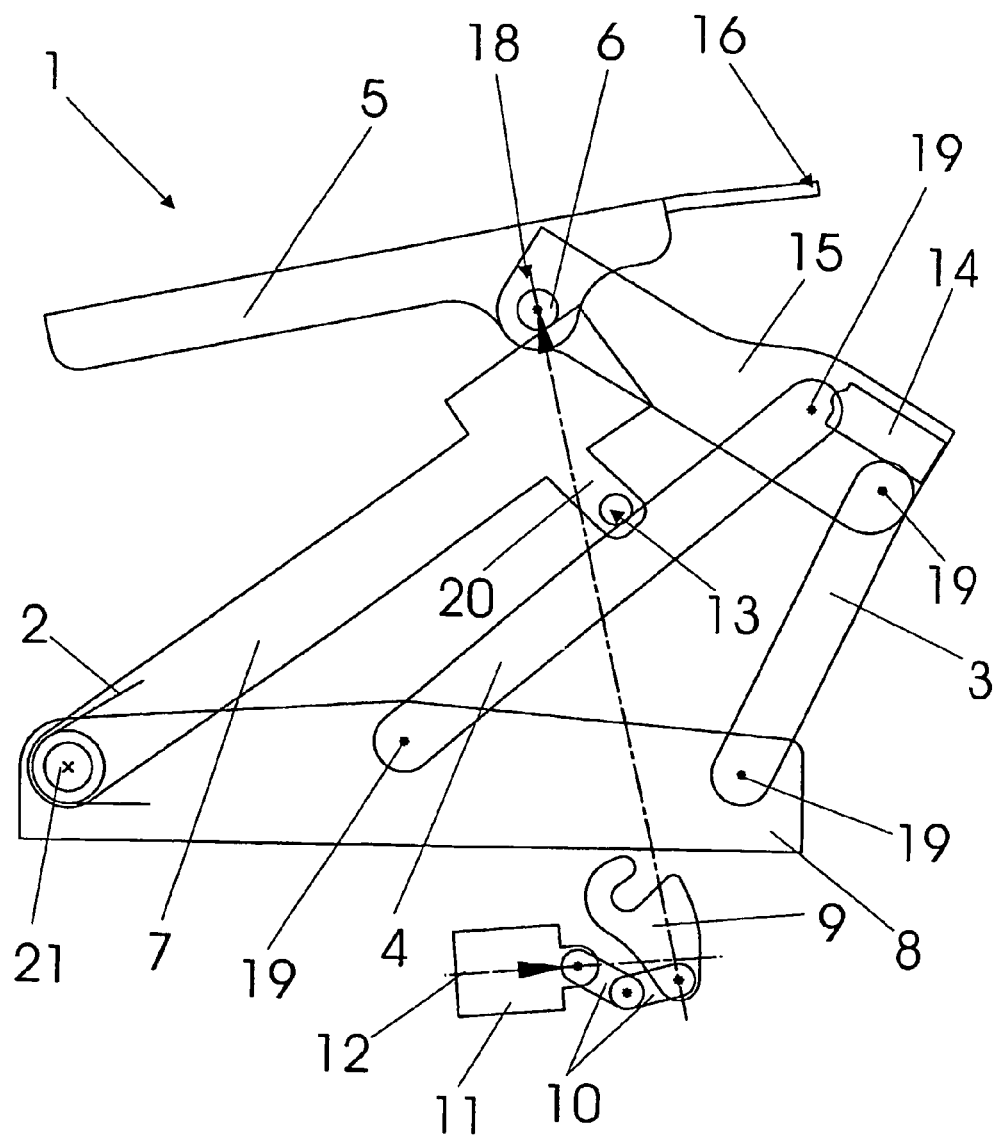
Figure 5:
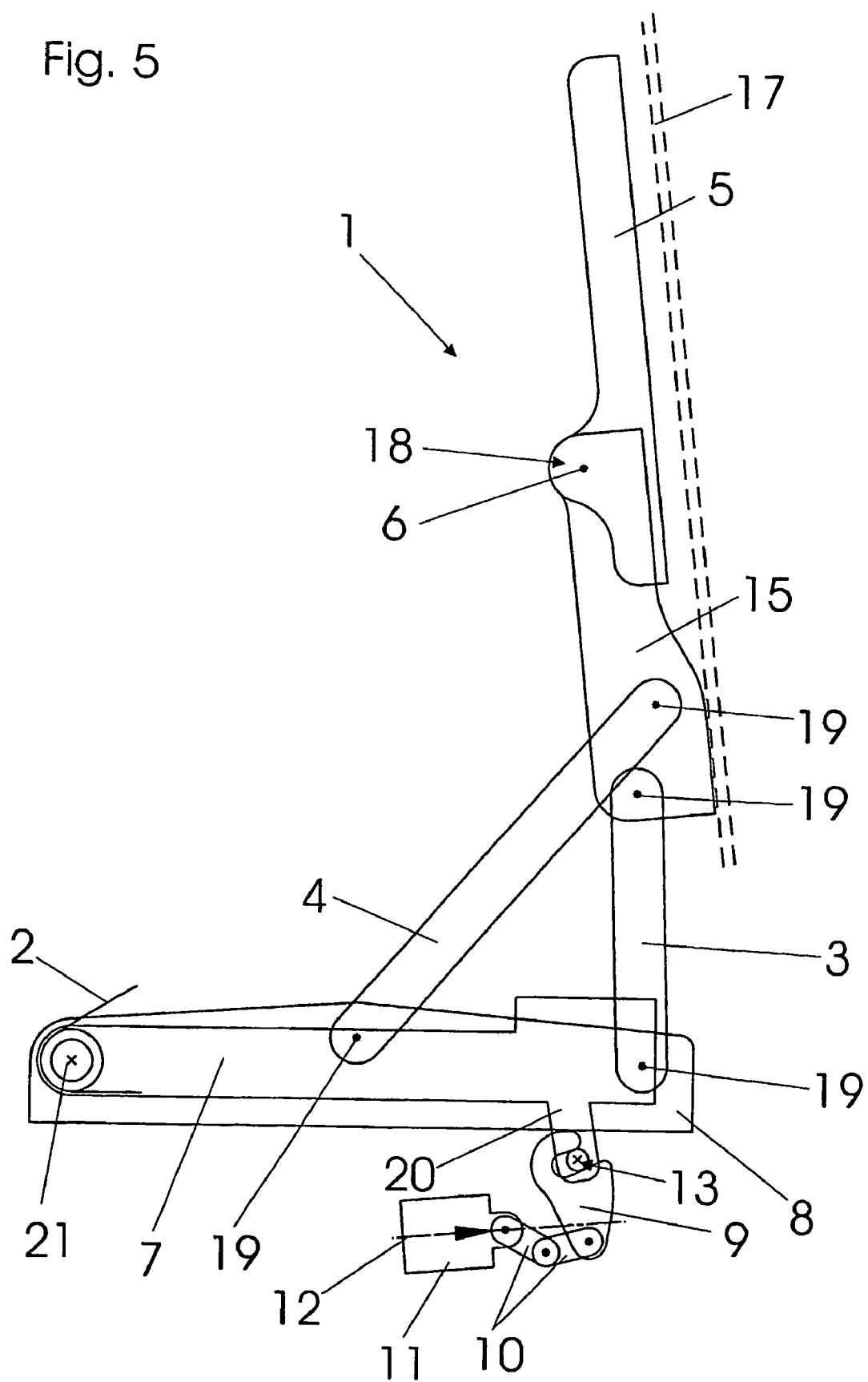

The figures show:

FIG. 1—an embodiment of the hinge device according to the invention, in a schematic representation, in the rest state, FIG. 2—the hinge device according to the invention, according to FIG. 1, after triggering of the adjustment lever, in a slightly raised state, FIG. 3—the hinge device according to the invention, according to FIG. 1, in a state in which it has been raised further, FIG. 4—the hinge device according to the invention, according to FIG. 1, in its end position in which it has been raised farthest, FIG. 5—the hinge device according to the invention, according to FIG. 1, in an end position that is characteristic for the normal opening state of the front hood, FIG. 6—the adjustment lever and the spring element of the hinge device according to the invention, according to FIG. 1, in a representation that has been developed further in terms of design, in the starting position, an intermediate position, and the farthest moved-out end position, after triggering in case of a collision.

FIGS. 1 to 5 and 6 show a preferred embodiment of a hinge device according to the invention, whereby FIGS. 1 to 5 give a very schematic representation of the functional principle, and FIG. 6 shows the design configuration of the adjustment lever and the spring element of a correspondingly configured hinge device. The same reference numbers refer to the same components and functions, respectively, in all of the figures.

The hinge device according to the invention proceeds from a known four-joint hinge device, in which two connecting bars 3, 4 are fixed in place on a base bracket 8 that can be fixed in place on a vehicle on the car body side, by way of a joint 19, in each instance. The two connecting bars 3, 4 have different lengths and thereby describe the movement path of a unit formed from an assembly plate 5 and a pivot lever 15, with which the two connecting bars 3, 4 are also connected, so as to rotate, with their opposite end regions by means of joints 19. In this connection, the assembly plate 5 and the pivot lever 15 can be releasably fixed in place on one another, in a manner still to be described in greater detail, and can perform a relative movement about a rotary joint 6, relative to one another. The two rotary joints 19 of the connecting bars 3, 4, which are fixed in place on the unit of assembly plate 5 and pivot lever 15, facing the front hood 17 that is merely indicated, are, to put it more precisely, fixed in place on the pivot lever 15, spaced apart from one another, so as to rotate. In this connection, the assembly plate 5 serves for fixation on the front hood 17, which covers the engine space of a vehicle, not shown in any detail, for example, in a manner not shown in any detail. To reduce injuries that a pedestrian can suffer in a typical pedestrian accident, due to a collision with the front hood 17 of the vehicle, in this connection the front hood 17 is raised as compared with its rest position shown in FIG. 1, in a manner still to be described, by means of the hinge device, if a corresponding impact of a pedestrian or the like is detected by sensor in the front region of the vehicle, not shown in any detail.

In this connection, a spring element 2, shown only very schematically here, which can advantageously be configured as a leg spring that is disposed biased about the rotary joint 21 of an adjustment lever 7, laid against the adjustment lever 7 with one leg, and held in the biased position by means of a triggering device 9, 10, 11, 13, in a manner still to be described in greater detail, serves to essentially suddenly raise the front hood 17 in its rear region, viewed in the direction of travel. In this connection, the spring element 2 presses the adjustment lever 7 in the direction of the front hood 17, as can be recognized in greater detail in FIG. 6, after it has been released by means of the triggering device 9, 10, 11, 13, with its end region assigned to the front hood 17, in such a manner that the front hood 17 is raised as compared with the normal rest position, in a manner still to be described in greater detail.

A pin-like projection 13 is disposed on the adjustment lever 7, on a nose 20, which projection is surrounded by a hook-like triggering lever 9 of the triggering device 9, 10, 11. In this way, the adjustment lever 7 is secured in its rest position, counter to the force of the spring element 2 and, at the same time, stands under the bias of the spring element 2. When the triggering lever 9 is released, in a manner still to be described in greater detail, the energy content of the biased spring element 2 is suddenly released, and suddenly turns the adjustment lever 7 into an upper end position that can be seen more precisely in FIG. 4. In this way, a pin-like segment 18 on the assembly plate 5 and therefore the front hood 17, also fixed in place on the assembly plate 5, is also suddenly moved in the direction of the rotation of the adjustment lever 7, and the front hood 17 is therefore raised in its rear region. In this connection, the adjustment lever 7 lies against the joint pin 6 in the region of the pin-like segment 18, and presses this joint pin 6 upward, with the assembly plate 5 and the pivot lever 15. In this connection, the adjustment lever 7 lies against the joint pin 6 in point form, without any particular fixation having taken place.

In this connection, the guidance of the front hood 17 during this movement takes place on the one hand by way of the connecting bars 3, 4 of the four-joint, and on the other hand by way of the interaction of assembly plate 5 and pivot lever 15. At the beginning of the movement of the front hood 17 upward (shown in FIG. 1), the assembly plate 5 and the pivot lever 15 form a unit, since they are connected with one another with a non-positive lock, by way of a catch connection composed of a catch edge 14 and a counter-edge 16. The catch edge 14, which is indicated only schematically in FIGS. 1 to 4, is formed by an additional part that is disposed fixed in place on the pivot lever 15 and provided with a nose, for example, in this connection. Since the pivot lever 15 and the assembly plate 5 are mounted to rotate relative to one another, by means of the rotary joint 6, a clear assignment between catch edge 14 and counter-edge 16 in the rest position according to FIG. 1 is guaranteed. If the spring element 2 is now moved in the direction of turning of the adjustment lever 7, by means of activation of the triggering lever 9 and release of the catch element 13, the assembly plate 5 will be moved on a different path than the pivot lever 15, which has only limited mobility, due to the joints 19 of the connecting bars 3, 4. As a result, the catch connection between the catch edge 14 and the counter-edge 16 is necessarily cancelled out, and the pivot lever 15 performs a relative rotation with regard to the assembly plate 5 and the front hood 17 disposed on it. The front hood 17 is held in the front region of the vehicle in a manner that is not shown, but fundamentally known, by means of a closure device, and can only perform a rotational movement about this closure device. Therefore the possible path of the front hood 17 in its rear region is also predetermined, so that the assembly plate 5 will rotate about the front-side closure device in corresponding manner.

As can be seen better in FIGS. 2, 3, and 4, the pivot lever 15 turns more and more relative to the assembly plate 5, with an increasing movement of the adjustment lever 7, until it has reached its kinematically possible end position as shown in FIG. 4. In this end position, the front hood 17 is raised to the maximally possible point, and therefore offers a corresponding resilience in the case of a collision of a pedestrian with the front hood 17, by means of deformation into the free region below the front hood 17.

In this connection, triggering of the spring element 2 takes place by means of a sensor, not shown, in the front region of the vehicle, in controlled manner, in that current is applied to an actor 11, and causes a displacement of a corresponding setting element of the actor 11, in the adjustment direction 12. This adjustment movement is transferred to the triggering lever 9 by way of intermediate transfer levers 10, which lever then performs a pivoting movement to release the catch element 13 on the adjustment lever 7, in a manner that will not be shown in any detail. With such a triggering device 9, 10, 11, 13, it can be reliably guaranteed that the triggering lever 9 releases the catch element 13, even after a long period of non-activation. In this way, the adjustment lever 7 is then released, and is accelerated in the lifting direction of the front hood 17 by means of the spring element 2, as already described. The actor 11, the transfer levers 10, as well as the triggering lever 9 and the related rotary joints are pre-assembled on an assembly plate, not shown, for example, and can therefore be installed in the vehicle in simple manner.

As is particularly evident from FIG. 5, the articulation of the adjustment lever 7 in its end region, facing the front hood 17, is implemented by way of a point-shaped contact on the pin 6, which is disposed on the pin-like segment 18 on the assembly plate 5, and therefore indirectly on the front hood 17. This method of transferring the adjustment movement of the adjustment lever 7 has its reason in that the hinge device 1 must allow lifting-off of the front hood 17 as shown in FIG. 5 in normal operation, which movement can be used for opening an engine space of the vehicle, for example. For this purpose, the movement of the front hood 17 is controlled solely by means of the connecting bars 3, 4 of the four-joint, in fundamentally known manner, but for this purpose the front hood 17 has to be able to move relative to the adjustment lever 7. For this purpose, the pin-like segment 18 can be lifted off from the adjustment lever 7, and laid down onto the adjustment lever 7 after the front hood 17 has been closed, by means of the kinematic guidance of the connecting bars 3, 4 of the four-joint. With this, however, the normal opening movement of the front hood is not impaired in any manner, by means of expansion of the hinge device 1 to include the raising function, but at the same time, a precise assignment of front hood 17 to the adjustment lever 7 is achieved.

In FIG. 6, with partial FIGS. 6a to 6c, the pivoting movement of the adjustment lever 7 during raising of the front hood 17 as well as the leg spring of the spring element 2 disposed on it can be seen in greater detail, in a representation showing the design more precisely. In this connection, the adjustment lever 7 is a component that has been bent at an angle from sheet-metal parts, for example, which is held on a screw-down panel 22 in the region of a rotary joint 21, on one side, so as to pivot, which panel in turn can be fixed in place on the vehicle side by means of screws disposed so that they can be inserted through bores 23, not shown in any detail. A leg spring 2 is disposed about the rotary joint 21 of the adjustment lever 7, which is inserted through an insertion opening 24 of the screw-down panel 22 with one leg, and rests on the inside of a contact bracket 25 formed on the adjustment lever 7 with its other leg. In this connection, the leg spring of the spring element 2 is installed in a biased configuration, so that the adjustment lever 7 would make a transition into the position shown in FIG. 6c without being fixed in place on the pin-like catch element 13 of the nose 20 and the triggering device 9, 10, 11 shown in FIGS. 1 to 4. On the top, and not shown in any detail in FIG. 6, the pin 6 of the pin-like segment 18 is then disposed, which brings the front hood 17 into the raised position by means of pivoting of the adjustment lever 7.

It is, of course, also possible to configure the spring element 2 in a different form, for example also to bring the adjustment lever 7 into a raised position, in a manner analogous to the manner described above, by means of fluid media.

REFERENCE NUMBER LIST

1—hinge device
2—spring element
3—connecting bar, four-joint
4—connecting bar, four-joint
5—assembly plate, front hood
6—rotary joint/pin
7—adjustment lever
8—base bracket
9—triggering lever
10—transfer lever
11—actor
12—adjustment direction, actor
13—catch element
14—catch edge
15—pivot lever
16—counter-edge
17—front hood
18—pin-like segment
19—rotary joint, four-joint
20—nose
21—rotary joint, adjustment lever
22—screw-down panel
23—bores
24—insertion opening, spring element
25—contact bracket

The invention claimed is:

1. An arrangement of a front hood on a vehicle, having at least one hinge device that lies in the rear when viewed in the direction of travel, in the form of a four-joint mechanism, having a long and a short connecting bar, whereby the front hood can be pivoted using the hinge device during normal opening and closing, and can be raised in the rear region in the case of a collision of the vehicle, wherein the hinge device has a spring element that activates an adjustment lever in the case of a collision of the vehicle, which lever in turn acts directly on the front hood and fits directly or through intermediate elements to the front hood, whereby the joints of the four-joint mechanism on the front hood side are fixed in place on a pivot lever, in articulated manner, which lever, in the state of rest, is releasably fixed in place on the front hood with one end, and can be pivoted about a rotary joint, relative to the front hood, with its other end, in the region of the assignment of the adjustment lever to the front hood, and the adjustment lever raises the front hood during a collision of the vehicle, guided by the connecting bars of the four-joint mechanism, and raises the pivot lever, which comes loose from the front hood on one side, as compared with the state of rest.

2. The arrangement according to claim 1, wherein the pivot lever is releasably fixed in place on the front hood with its one end, in such a manner that when a predetermined force in the direction of the change in position of the adjustment lever is exceeded, its releasable connection with the front hood is released when the adjustment lever is triggered, and it can be pivoted about its rotary joint disposed on the front hood at its other end.

3. The arrangement according to claim 2, wherein the pivot lever is fixed in place on the front hood with one end, by way of a non-positive-lock and/or positive-lock connection.

4. The arrangement according to claim 3, wherein the non-positive-lock or positive-lock connection is formed by a mechanical catch connection in which a functional edge on the pivot lever engages behind a counter-shape disposed on the front hood side, and is locked in place with it in the normal state of rest of the front hood.

5. The arrangement according to claim 1, wherein the front-hood-side end of the adjustment lever stands in a non-positive-lock connection by way of an essentially pin-shaped segment on the front hood.

6. The arrangement according to claim 5, wherein the essentially pin-shaped segment on the front hood can be lifted off from the adjustment lever during normal operation of the hinge device to open the front hood using the four-joint mechanism.

7. The arrangement according to claim 5, wherein when the adjustment lever is released in the case of a collision, the adjustment lever suddenly pushes the essentially pin-shaped segment on the front hood in the direction towards the raised position of the front hood and, in this connection, the pivot lever releases the non-positive-lock connection with the front hood, at its end releasably fixed in place on the front hood, and pivots relative to the front hood about its rotary joint formed at its other end.

8. The arrangement according to claim 5, wherein in the normal state of rest of the front hood, the front-hood-side end of the adjustment lever is disposed and fixed in place on the car body side in such a manner that the essentially pin-shaped segment on the front hood rests against the adjustment lever.

9. The arrangement according to claim 5, wherein the rotary joint of the pivot lever on the front hood and the pin-shaped segment of the front hood have an identical point of rotation.

10. The arrangement according to claim 5, wherein the pivot lever and the pin-shaped segment are fixed in place on the front hood using a common assembly part.

11. The arrangement according to claim 1, wherein because of the rotary movement of the pivot lever, on the one hand, and the pivoting movement of the adjustment lever, on the other hand, the front hood performs a pure pivot movement about a closure device disposed on the front end side of the vehicle, on the front hood, without any relative displacements of the front hood in the longitudinal direction of the vehicle, relative to the closure device.

12. The arrangement according to claim 1, wherein the spring element has a mechanical leg spring that is biased in the normal state of operation of the arrangement.

13. The arrangement according to claim 1, wherein the adjustment lever is held in the state of rest, using a triggering device, in its state of being biased by the spring element.

14. The arrangement according to claim 1, wherein the triggering device can be controllable by way of an actor, in the case of a collision, and releases the adjustment lever from its biased state, by way of lever devices, with mechanical amplification.

15. The arrangement according to claim 14, wherein the actor has an electromagnetic switch.

16. The arrangement according to claim 1, wherein the triggering device has a hook-shaped segment that engages behind an assigned segment of the adjustment lever in the state of rest, and secures the adjustment lever in its position counter to the effect of the spring element.

17. The arrangement according to claim 16, wherein the hook-shaped segment of the triggering device, the adjustment lever, and the spring element can be made to be brought back into their starting state after triggering of the front hood, and can be activated again.

* * * * *